United States Patent [19] [11] Patent Number: 5,025,334
Perona et al. [45] Date of Patent: Jun. 18, 1991

[54] AUTO-LOADING TRANSPORT FOR TAPE CARTRIDGE WITH TAPE ACCESS DOOR AND BELT CAPSTAN ROLLER

[75] Inventors: Mark Perona; Tom C. Woller, both of San Diego; Jon S. Guy, Carlsbad, all of Calif.

[73] Assignee: Cipher Data Products, Inc., San Diego, Calif.

[21] Appl. No.: 405,932

[22] Filed: Sep. 12, 1989

[51] Int. Cl.⁵ ............................................. G11B 5/008
[52] U.S. Cl. ..................................... 360/96.5; 360/93
[58] Field of Search ..................... 360/93, 96.1, 96.5, 360/96.6, 105

[56] References Cited

U.S. PATENT DOCUMENTS

| | | |
|---|---|---|
| 4,559,571 | 12/1985 | Olmsted et al. ............... 360/105 |
| 4,573,091 | 2/1986 | Barton et al. ................. 360/93 |
| 4,586,095 | 4/1986 | Olmsted ........................ 360/93 |
| 4,608,615 | 8/1986 | Zeavin .......................... 360/96.5 |
| 4,636,890 | 1/1987 | Rudi et al. .................... 360/96.5 |
| 4,673,995 | 6/1987 | Spiegelstein .................. 360/93 |
| 4,677,508 | 6/1987 | Barton et al. ................. 360/96.5 |
| 4,796,120 | 1/1989 | Komatsu et al. ............... 360/96.5 |
| 4,807,067 | 2/1989 | Spiegelstein .................. 360/93 |
| 4,866,552 | 9/1989 | Magase ......................... 360/96.5 |

OTHER PUBLICATIONS

Pending U.S. patent application Ser. No. 07/342,985 Filed Apr. 25, 1989 Naming Jagmohan S. Kukreja and Kurt A. Buckland and Entitled "Stationary Head Tape Drive".

Primary Examiner—John H. Wolff
Assistant Examiner—Jefferson Evans
Attorney, Agent, or Firm—Baker, Maxham, Jester & Meador

[57] ABSTRACT

A tape transport fits within the five and one-quarter inch form factor and has motor driven mechanisms for automatically loading a DC600-type cartridge endwise therein. The transport includes a frame dimensioned to fit within the form factor, and a front panel extending across a forward transvere end of the frame. The front panel has a slot dimensioned so that the cartridge can be endwise inserted through the slot onto a tray movably supported within the frame. A read/write head is mounted to the frame adjacent the tray for reciprocating the head along an axis perpendicular to a base plate of the cartridge. A capstan drive motor is also mounted to the frame adjacent the tray so that a capstan drive roller connected to its shaft can drive a belt capstan roller of the cartridge. Guides associated with the tray permit the same to be moved by a motor driven gear box to automatically carry the cartridge rearwardly and then laterally into engagement with the read/write head and the capstan drive roller. A door opener partially opens the tape access door of the cartridge as the cartridge moves rearwardly so that when the cartridge is thereafter moved laterally the head can engage the tape.

37 Claims, 9 Drawing Sheets

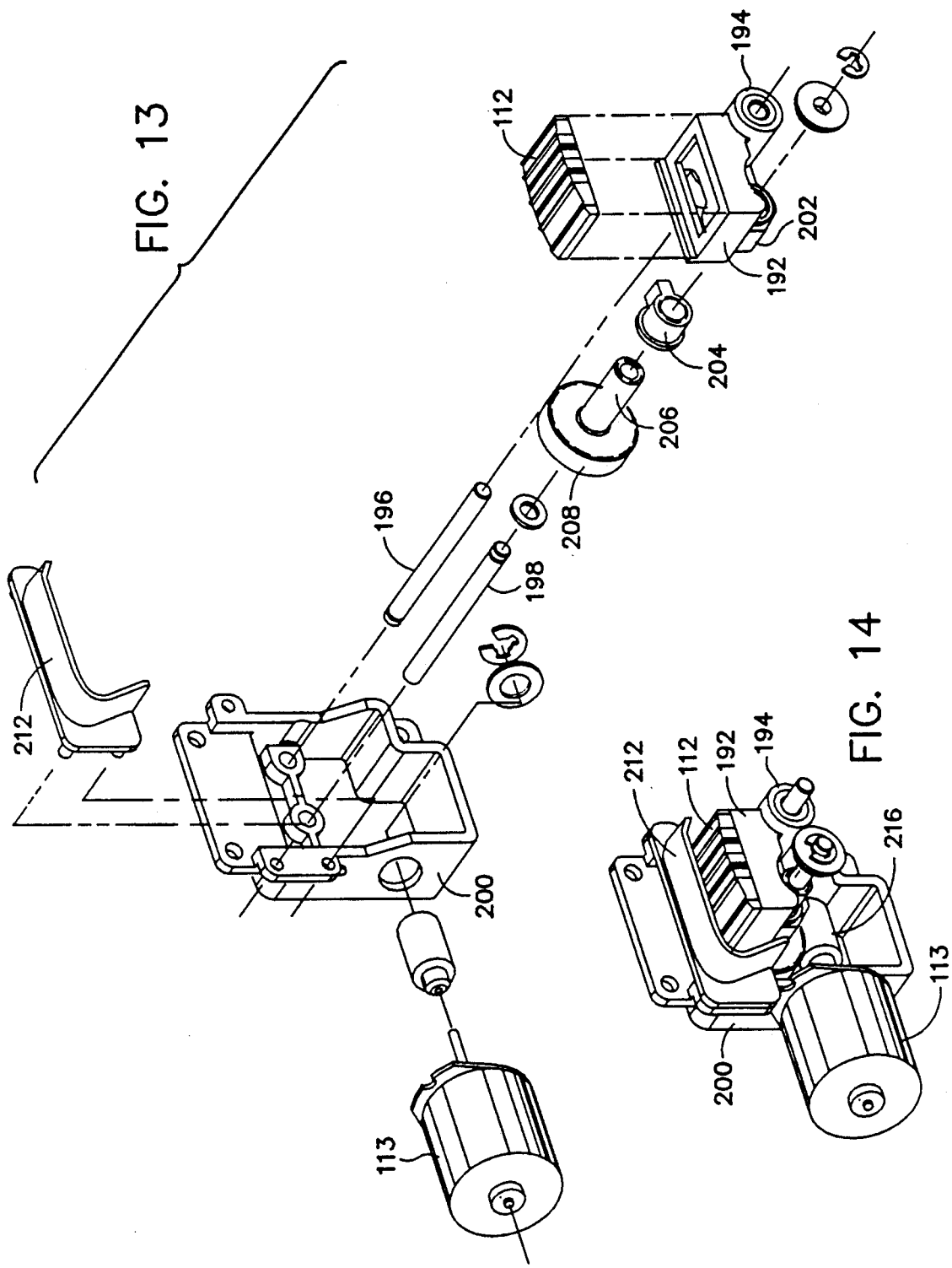

AUTO-LOADING TRANSPORT FOR TAPE CARTRIDGE WITH TAPE ACCESS DOOR AND BELT CAPSTAN ROLLER

BACKGROUND OF THE INVENTION

The present invention relates to peripheral memory storage devices for computers, and more particularly, to transports that provide the mechanical functions required to store and retrieve digital data from magnetic tape.

Most personal computer systems have Winchester disk drives that provide both substantial storage capacity and rapid data access. A popular Winchester disk drive has a five and one-quarter inch diameter rigid disk that can store forty megabytes or more of information. Archival back-up storage is desirable, yet backing up this type of hard disk drive with floppy diskettes is tedious. This is because the storage capacity of such "floppies" is relatively small and many must be loaded and unloaded in succession For many years tape drives have been available for providing back-up storage for personal computers having Winchester disk drives. They permit the entire contents of the hard disk to be stored on a single tape cartridge of, for example, the type defined by ANSI X3.55-1977. See also U.S. Pat. No. 3,692,255. This type of cartridge has been sold in large numbers under the designations DC300 and DC600 by Minnesota Mining and Manufacturing Company. Both the DC300 and the DC600 are identical mechanically except for the length of tape. This type of tape cartridge is hereafter referred to as the "DC600-type" cartridge, which is presently the most widely used configuration. That cartridge measures six inches in length by four inches in width. It has a belt capstan roller which may be engaged by a capstan drive roller to propel a length of magnetic tape, either 300 feet or 600 feet, between a pair of reels inside a plastic housing. The cartridge further has a hinged tape access door which may be opened to expose the tape. The opening of this tape access door increases the width of the tape cartridge from four inches to five and three-quarter inches when the door is fully opened. Both the DC300 and the DC600 are identical mechanically except for the length of tape.

For many years both floppy disk drives and Winchester disk drives have been manufactured according to a de facto size standard which requires that they fit within a physical envelope (rectangular box) measuring three and one-quarter inches in height by five and three-quarter inches in width by eight inches in length. The aforementioned dimensions are known throughout the computer peripherals industry as the five and one-quarter inch form factor. This is a name derived from the diameter of the disk. Originally the DC600 type cartridge was designed to be loaded sideways into a tape transport sized to fit an earlier, larger form factor measuring eight inches in width. When the five and one-quarter inch Winchester disks first became popular it was believed that a tape drive could not be provided that would permit endwise loading of the DC600-type tape cartridge into the same form factor. The term "endwise" refers to loading the cartridge so that the side edge with the tape access door and belt capstan roller is generally parallel to a longitudinal axis of the frame (eight inch dimension of the form factor).

Engineers at Cipher Data Products, Inc., the assignee of this application, were the first to invent a tape drive that would permit endwise loading of the DC600-type tape cartridge in the five and one-quarter inch form factor while still achieving the required cartridge registration, door opening, read/write head engagement, capstan drive roller engagement and track selection functions in a very confined space too small to permit full opening of the tape access door. See U.S. Pat. Nos. 4,573,091 and 4,677,508 of William M. Barton, Jr. et al. This endwise loading configuration has permitted backup tape drives to fit within the five and one-quarter inch receptacles in a wide variety of personal computers (PCs). This has enabled computer owners to continue using their large libraries of existing DC600-type cartridges. Several hundreds of millions of dollars worth of tape drives covered by the claims of the aforementioned patents have been sold by Cipher Data Products, Inc., Wangtek, Inc., Archive Corporation and others. Claims of the aforementioned U.S. Pat. Nos. 4,573,091 and 4,677,508 were found not invalid and were found to have been infringed by a jury verdict rendered on May 26, 1988 in the case of *Cipher Data Products, Inc.* v. *Wangtek, Inc.* (Civil Action No. 86-3792 EFL) in the United States District Court for the Northern District of California.

Disk drives have subsequently been developed and widely sold that fit the five and one-quarter inch form factor in width and length, but which only require one and five-eighths inches in height. Two of these so-called half-height drives can fit in the same five and one-quarter inch form factor. Half-height end loading tape drives for the DC600 type cartridge embodying the invention of U.S. Pat. Nos. 4,573,091 and 4,677,508 have also been sold in large numbers.

Initially, all commercially successful end loading tape drives for the DC600-type cartridge utilized manually actuated mechanisms for opening the tape access door and swinging the read/write head and capstan drive roller into engagement with the cartridge and for reversing the process to unload the cartridge. Two of the three most popular drives (Cipher and Archive) employ a load lever which must be slid back and forth to operate a head and capstan engaging linkage. A third one of the most popular drives (Wangtek) has utilized a so-called "push-push" spring loaded reciprocating tray mechanism which moves the head and capstan drive through a linkage. While such tape drives have in general been quite serviceable, they have required some degree of user familiarity to operate. Jams have occurred. In some cases the head can be engaged too rapidly, or even rammed into the cartridge housing. Cartridge ejection has generally been acceptable, although manual actuation has been required. Aside from the inconvenience of such manual loading, the principal drawback of such prior configurations has been that the head must be swung into and out of engagement with the tape. Since this requires that the head be supported for pivotal movement, it has been difficult to maintain the tolerances required for accurate reading and writing of data as the storage capacity of such drives has increased, bringing with it a requirement for increased numbers of tracks on the tape and increased recording densities (bits per inch).

U.S. Pat. No. 4,673,995 of Spiegelstein discloses a five and one-quarter inch form factor tape drive for end loading the DC600-type cartridge in which the cartridge is first end load during which the door is opened by a skewed friction roller. The cartridge is then manually pivoted laterally (in a horizontal plane) into engagement with a head. The head is fixed in the horizontal plane, but is vertically reciprocable for track selection. Cipher Data Products, Inc. has successfully commercialized an improved version of the Spiegelstein configuration denoted the ST150S/90 in which the cartridge is translated laterally in parallel with its end edges, instead of pivoting laterally about a point located rearward on the metal base plate of the cartridge. The lateral translation of the cartridge in this ST150S/90 drive is accomplished through manual sliding of a loader lever. The improved design of this drive has enabled the storage of approximately 150 megabytes of data on a single DC600 type cartridge. However, this drive still requires a degree of operator familiarity with the manual cartridge loading and unloading process.

U.S. Pat. No. 4,559,571 of Olmsted et al. discloses a full height, manually end loaded, five and one-quarter inch form factor tape drive for the DC-600 type cartridge. The insertion slot is sealed by manually closing hinged door 42. After the tape access door of the cartridge is opened the read/write head 30 is swung both vertically and laterally into engagement with the tape. This head movement is actuated by drive motor 66.

U.S. Pat. No. 4,636,890 of Rudi et al. discloses another five and one-quarter inch form factor drive for the DC-600 type cartridge in which the read/write head is swung into engagement through a linkage connected to the door that closes the cartridge insertion slot U.S. Pat. No. 4,796,120 of Komatsu et al. discloses another half-height, end loading five and one-quarter inch form factor tape drive for the DC600-type cartridge. The cartridge is manually inserted endwise onto a cartridge guide plate 50, in a door-first orientation. The tape access door is opened and then a hinged door 20 on the front of the tape drive is manually swung up to close the cartridge insertion slot. At the same time, mechanisms connected to the door move the read/write head vertically and the cartridge laterally into engagement with the head.

SUMMARY OF THE INVENTION

It is therefore the primary object of the present invention to provide a five and one-quarter inch form factor mechanical transport in which the cartridge can be automatically loaded and unloaded that may be utilized in a tape drive for reading and writing digital data in very high densities on a DC600-type cartridge.

It is another object of the present invention to provide a half-height auto-loading, five and one-quarter inch form factor mechanical transport for the DC600-type cartridge.

It is another object of the present invention to provide a five and one-quarter inch form factor mechanical transport for the DC600-type cartridge that will improve control of the movement of the cartridge to minimize the possibility of an operator damaging the internal components of the drive.

It is another object of the present invention to provide an auto-loading, five and one-quarter inch form factor mechanical transport for the DC600-type cartridge that eliminates the need for a manual load actuating lever on the front panel of the drive to thereby minimize operator interface and give the drive a cleaner look from the front.

It is another object of the present invention to provide an auto-loading, five and one-quarter inch form factor mechanical transport for the DC600-type cartridge that has a moveable door that automatically seals the cartridge insertion slot after the cartridge has been loaded therein.

It is another object of the present invention to provide an auto-loading, five and one-quarter inch form factor mechanical transport for the DC600-type cartridge that has a moveable door that automatically seals the cartridge insertion slot after the cartridge has been unloaded therefrom.

It is another object of the present invention to provide an auto-loading, five and one-quarter inch form factor mechanical transport for the DC600-type cartridge that has a mechanism for manually ejecting the cartridge in the event of a power failure or some other failure preventing automatic ejection.

It is another object of the present invention to provide an auto-loading, five and one-quarter inch form factor mechanical transport for the DC600-type cartridge that has a mechanism for accomplishing electrostatic discharge of the cartridge during loading.

The present invention provides a tape transport that fits within the five and one-quarter inch form factor and has motor driven mechanisms for automatically loading a DC600-type cartridge endwise therein. The transport includes a frame dimensioned to fit within the form factor, and a front panel extending across a forward transverse end of the frame. The front panel has a slot dimensioned so that the cartridge can be endwise inserted through the slot onto a tray movably supported within the frame. A read/write head is mounted to the frame adjacent the tray for reciprocating the head along an axis perpendicular to a base plate of the cartridge. A capstan drive motor is also mounted to the frame adjacent the tray so that a capstan drive roller connected to its shaft can drive a belt capstan roller of the cartridge. Guides associated with the tray permit the same to be moved by a motor driven gear box to automatically carry the cartridge rearwardly and then laterally into engagement with the read/write head and the capstan drive roller. A door opener partially opens the tape access door of the cartridge as the cartridge moves rearwardly so that when the cartridge is thereafter moved laterally the head can engage the tape.

BRIEF DESCRIPTION OF THE DRAWINGS

FIG. 13 is an exploded view illustrating details of the head mounting assembly that permits vertical reciprocation of the read/write head for track selection in the preferred embodiment.

FIG. 14 is an assembled view of the head mounting structure illustrated in FIG. 13.

DESCRIPTION OF THE PREFERRED EMBODIMENT

Figure 1:
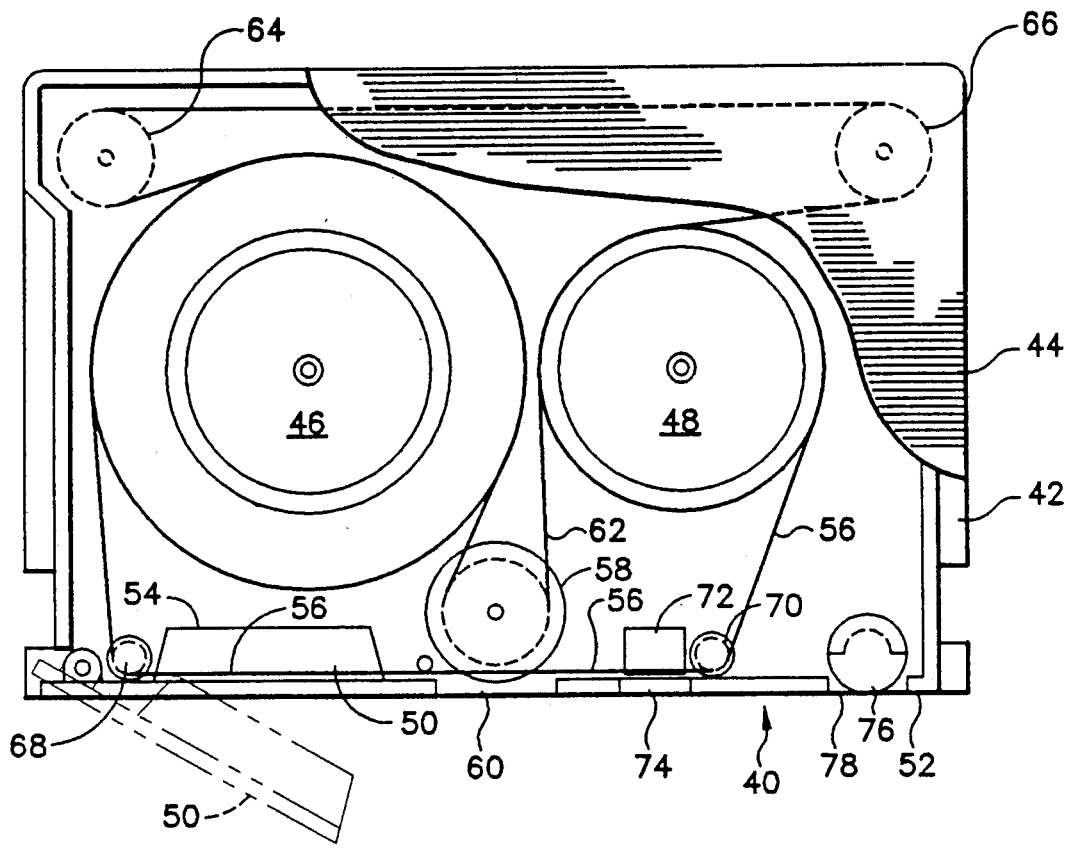
FIG. 1 is a plan view of a conventional DC600-type cartridge.

Details of the DC600-type cartridge 40 are illustrated in FIG. 1. It measures approximately six inches in length by four inches in width. The cartridge has a metal base plate 42 and a plastic cover 44 attached to the base plate which encloses a pair of reels 46 and 48. A door 50 is hingedly mounted between the base plate and the cover along a side edge 52 of the cartridge. The door is pivotable about an axis perpendicular to the base plate to open a cut-out region 54 in the cover and thereby permit access to a length of tape 56. When the door 50 is fully opened so that it extends perpendicular to the side edge of the cartridge, it increases the width of the cartridge from four inches to approximately five and three-quarter inches.

The length of tape 56 is windable between the reels by driving a belt capstan roller 58 rotably mounted along the side edge of the cartridge between the base plate an the cover. A larger diameter portion of the roller 58 protrudes through an opening 60 in the cover 44 for engagement by a capstan drive roller of the tape transport. A drive belt 62 is driven by the belt capstan roller 52. This belt is entrained about a smaller diameter portion of the belt capstan roller 58 (illustrated in phantom lines) and about two separate rollers 64 and and 66 rotatably mounted inside the cover 44 at the corners thereof. The belt also engages the tape pack on each of the reels to rotate the reels to wind the tape therebetween in a manner that assures uniform tape tension. The tape also passes around a pair of smaller idler rollers 68 and 70.

The cartridge 40 (FIG. 1) also has a mirror 72 positioned behind a window 74 in the side edge of the cover which is utilized in connection with an end of tape (EOT)/beginning of tape (BOT) sensing mechanism in the tape transport. The cartridge also has a file protect mechanism consisting of a rotatable half cylinder 76 positioned in front of a cut-out region 78. A file protect sensor in the tape drive determines whether or not the cut-out region 78 is blocked by the semi-circular portion of the cylinder 76. If so, writing on the tape is disabled so that the integrity of the data already stored thereon is preserved.

Figure 2:
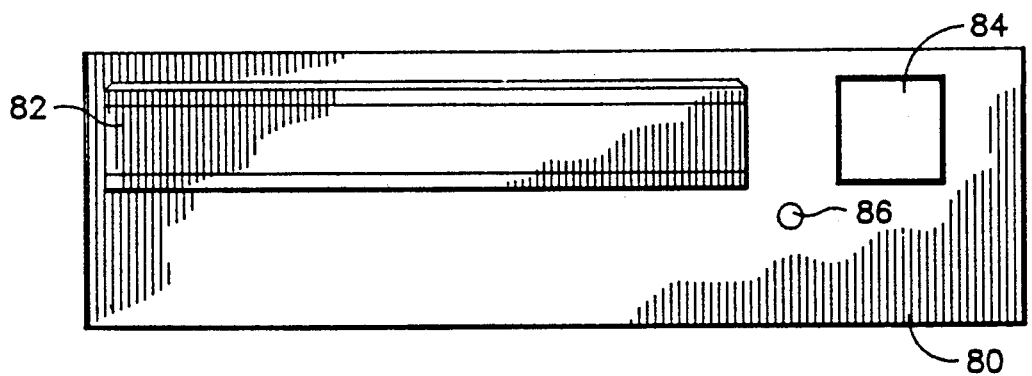
FIG. 2 is a front elevation view illustrating the front panel of a preferred embodiment of the tape transport of the present invention.

Referring to FIG. 2, the illustrated embodiment of our tape transport has a front bezel or panel 80 with a slot therethrough (not visible) dimensioned for having a DC600-type cartridge inserted endwise therethrough. A moveable door 82 closes the cartridge insertion slot after a cartridge has been fully loaded into the tape transport. This reduces audible motor noise from the transport and gives the front of the transport a finished look. The door 82 also reduces the amount of dust and contamination inside the drive which contributes to read/write errors, particularly at high recording densities. An eject button 84 extends through an aperture in the upper right-hand corner of the front panel 80. An LED 86 mounted on the front panel can be energized to indicate drive select status.

Figure 3:
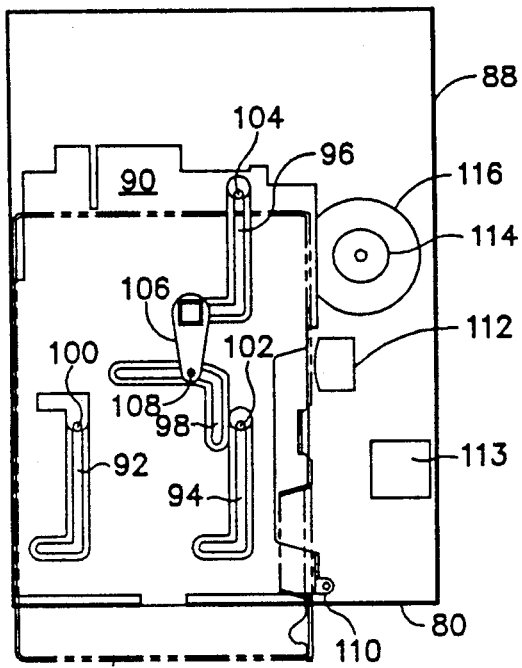
FIGS. 3-6 are a sequence of simplified plan views of the preferred embodiment illustrating the automatic loading of a DC600-type cartridge therein.

Referring to FIG. 3, the transport of the preferred embodiment has a generally rectangular frame 88 dimensioned to fit the five and one-quarter inch form factor. Its length is such that it will fit within a receptacle in a computer measuring approximately eight inches in length (up and down in FIG. 3). The width of the frame 88 (left to right in FIG. 3) is such that it will fit within a receptacle width of approximately five and three-quarter inches. Thus the frame is dimensioned to fit within the five and one-quarter inch form factor and to receive the DC600-type cartridge endwise therein. The phrase "within the frame" generally refers to something fitting within the perimeter dimensions thereof. The illustrated tape transport has a so-called "half-height" configuration meaning that the height of the frame 88 is approximately one and five-eighths inches. This is roughly the vertical dimension of the front panel 80 (FIG. 2) of the transport. This half-height configuration permits the illustrated tape transport and a half-height five and one-quarter floppy disk drive to be stacked in "piggy back" fashion within the same standard five and one-quarter form factor receptacle in a PC. The illustrated tape transport may also be provided with a suitable housing (not shown) for stand alone operation outside the PC.

Referring again to FIG. 3, the DC600-type cartridge 40 (illustrated in phantom lines) is first endwise inserted through the slot in the front panel 80 onto a horizontal tray 90. The tray is located inside the frame 88 for receiving the cartridge 40 endwise thereon so that the metal base plate 42 of the cartridge is substantially parallel with the horizontal plane of the tray. The side edge 52 of the cartridge is generally parallel to the longitudinal axis (eight inch dimension) of the frame. The tray has three similar L-shaped guide slots 92, 94 and 96 formed therein. These slots are arranged in a triangular configuration with the slots 94 and 96 in longitudinal alignment. An L-shaped actuator slot 98 with an intermediate angled segment is formed in the medial area of the tray 90 in the portion thereof roughly between the guide slots 92, 94 and 96.

Three separate tray guide pins 100, 102 and 104 (FIG. 3) extend vertically through the guide slots 92, 94 and 96, respectively. The lower ends of these pins are rigidly mounted to the frame 88. The tray is vertically supported by means not visible in FIGS. 3–6. The diameter of the tray guide pins is slightly less than the width of the guide slots so that the tray can slide first longitudinally and and then laterally relative to the pins. This tray motion is illustrated by the large arrows in FIGS. 4 and 5. The tray guide pins direct the longitudinal and lateral movement of the tray 90.

A motor driven gear box 105 (FIG. 7) rotates an output arm 106 (FIG. 3) having an actuator pin 108 mounted to the outer end thereof. This actuator pin extends vertically through the actuator slot 98 in the middle of the tray. The length of the lateral and longitudinal segments of the guide slots 92, 94 and 96 is selected relative to the radius of travel of the actuator pin and the length of each segment of the actuator slot 98 so that counter-clockwise rotation of the output arm through the positions illustrated in FIGS. 3–6 will first cause the tray to fully retract longitudinally and to thereafter move laterally (to the right) inside the frame. Thus a motor driven load or tray drive mechanism is provided which includes the gear box 105 and the output arm 106. It moves the tray to carry the cartridge 40 from its initial load (home) position illustrated in FIG. 4, through its intermediate load position illustrated in FIG. 5, to its final load (read/write) position illustrated in FIG. 6. The location of the drive guides is selected so that the gear box 105 applies the maximum force through the center of gravity of the cartridge.

The tray 90 is preferably dimensionally stable and resists head cleaner solution. Preferably it has a low coefficient of friction since the metal base plate of the cartridge 40 will be repeatedly slid over the same. The tray should also have low wear properties. In addition, the tray should have moderate temperature resistance, minimal tendency to warp, low creep and minimal cost. One suitable material for the tray 90 is thermoplastic polymer with 15% PTFE, 15% glass fibers and flame retardant.

A door opener 110 (FIG. 3) is connected to the frame 88 adjacent the tray 90 for opening the tape access door 50 of the cartridge. As the tray 90 is retracted from its position illustrated in FIG. 4 to its position illustrated in FIG. 5, carrying the cartridge 40 rearwardly with it, the tape access door 50 is partially opened so that it extends at a acute angle relative to the side edge 52 of the cartridge. Details of the door opener 110 are described later on.

A transducer in the form of a suitable read/write head 112 (FIG. 3) is mounted to the frame 88 adjacent the tray 90 for movement along a vertical head reciprocation axis generally perpendicular to the base plate 42 of the cartridge. When the tray 90 moves laterally from its position illustrated in FIG. 5 to its position illustrated in FIG. 6, carrying the cartridge 40 laterally with it, the tape 56 exposed by opening the access door 50 is engaged by the read/write head 112. A stepper motor 113 drives a head mounting assembly described later on in detail to move the read/write head along the head reciprocation axis. This permits one of a plurality of tracks of date recorded on the tape 56 t be selected.

A capstan drive roller 114 (FIG. 3) is also rotatably mounted adjacent the tray 90, rearward of the read/write head 112. This drive roller is secured to the upper end of the shaft of a brushless DC capstan drive motor 116. When the cartridge 40 is shifted laterally into engagement with the read/write head, it is also shifted into engagement with the capstan drive roller 114. See FIGS. 5 and 6. More specifically, the drive roller 114 is positioned to drivingly engage the belt capstan roller 58 of the cartridge so that the motor 116 can drive the tape between the reels inside the cartridge past the read/write head 112. The capstan motor 116 is preferably mounted on a pivoting gimball. A spring (not shown in FIGS. 3–6) is connected between the gimball and the frame for biasing the drive roller 114 against the belt capstan roller 58 of the tape cartridge.

Figure 7:
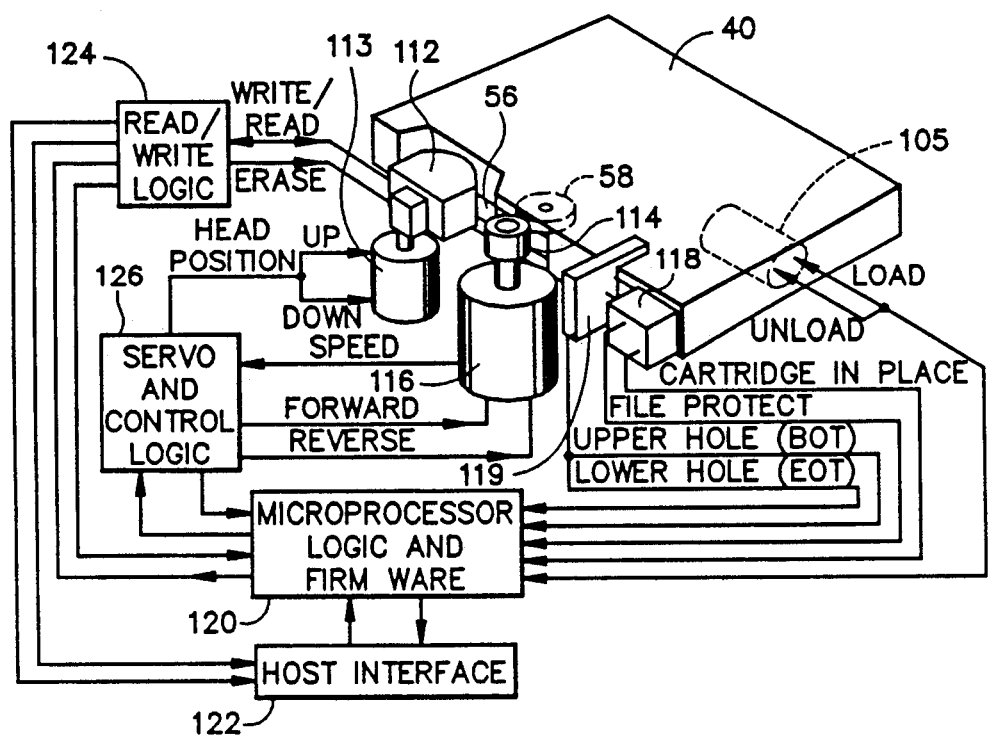
FIG. 7 is a schematic illustration of a control system that may be used with the present invention to provide a tape drive capable of reading and writing data on the DC600-type cartridge.

Referring to FIG. 7, the read/write head is vertically reciprocable by energizing the stepper motor 113. By way of example, data may be recorded in twelve parallel tracks recorded in serpentine fashion along the length of the quarter-inch tape. With the DC600-type cartridge it is possible to store one-hundred and fifty megabytes of data on the tape. Recent technological advances will permit as much as three hundred megabytes of data to be stored on this cartridge. Conventional file protect and cartridge-in-place sensors 118 are mounted to the frame 88 of the transport at a location near the rear of the side edge 52 of the tape cartridge. The file protect sensor determines whether or not the cut-out region 78 is blocked by the semi-circular portion of the cylinder 76. If so writing on the tape is disabled so that the integrity of the data already stored thereon is preserved. The cartridge-in-place sensor detects the complete insertion of the tape cartridge 40 onto the tray 90. This sensor may comprise a micro-switch which is mechanically closed by engagement with the side edge 52 of the tape cartridge to send a signal to the control circuitry of the tape drive. A conventional beginning of tape/end of tape (BOT/EOT) sensor 119 is also mounted to the frame so that it will be adjacent the side edge of the tape cartridge upon insertion thereof.

The subject invention is mechanical in nature. It will be understood that control circuits, servo mechanisms, read/write circuits, formatting circuits, error detection and correction circuitry, etc. that may be used with the mechanical tape transport described herein to read and write data on a DC600-type cartridge are well known to those skilled in the design of quarter-inch tape drives and need not be described in detail herein. However, in order to provide the reader with background, the following brief electronic description is provided.

A suitable control circuit for use with the tape transport described herein includes microprocessor and firmware logic 120. A host interface 122 is provided for enabling communication between a computer or other source of data (not illustrated). Read/write logic 124 is connected between the magnetic head 112 on the one hand and the microprocessor 120, and host interface 122 on the other hand. The head 112 also functions to erase blocks of data on the tape under control of the read/write logic 124. The microprocessor controls the stepper motor 113 for track selection. The microprocessor controls the movement of the tape by actuating the capstan drive motor 116 through servo and control logic 126. In addition, the microprocessor controls the automatic loading and ejection of the tape cartridge via actuation of motor driven gear box 105.

Figure 11:
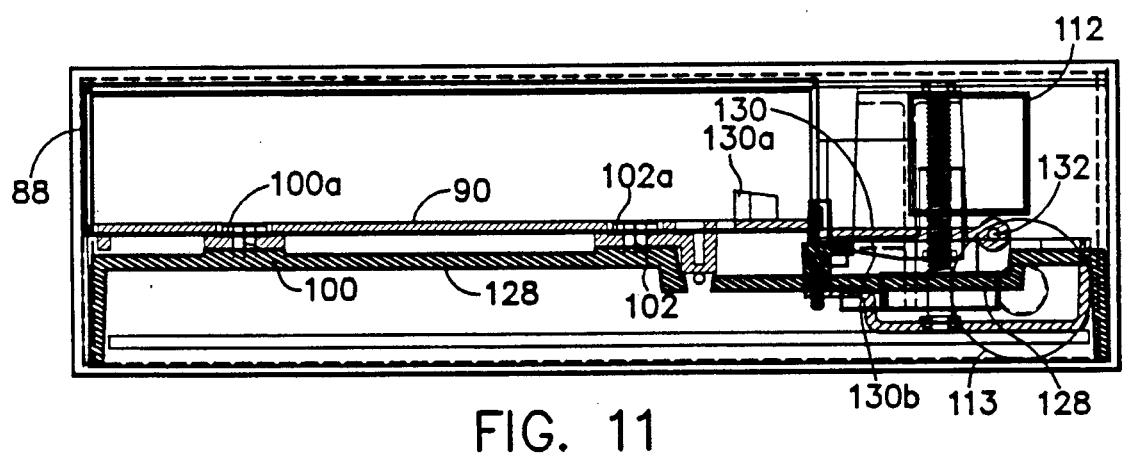
Figure 12:
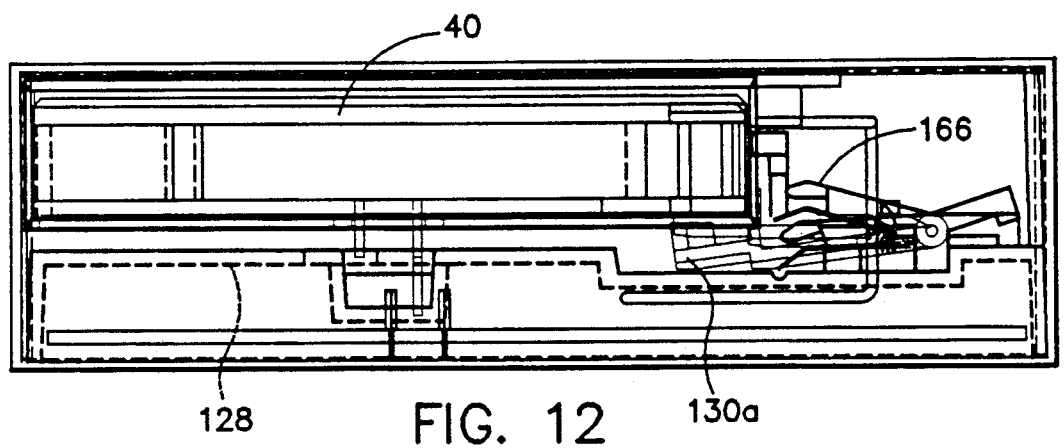

Further details of the tray 90 and the manner in which it is supported and guided are visible in the vertical sectional view of FIG. 11. The tray guide pins such as 100 and 102 extend upwardly from a horizontal platform 128 connected to the frame 88. The L-shaped guide slots in the tray such as 92 and 94 are generally T-shaped. The guide pins are provided with heads such as 100a and 102a which ride in the wider upper portions of the guide slots. The shanks of the guide pins extend through the narrower lower portions of the guide slots.

Figure 15:
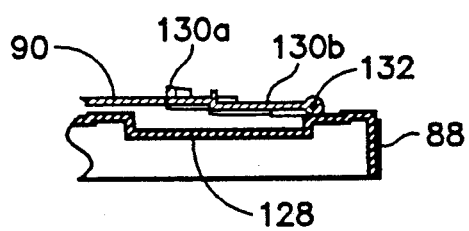
FIG. 15 is a vertical sectional view transverse to the longitudinal dimension of the preferred embodiment of the tape transport illustrating details of the tray guard that guides the cartridge during insertion into the tape transport. The tray guard is illustrated in its elevated position.
Figure 16:
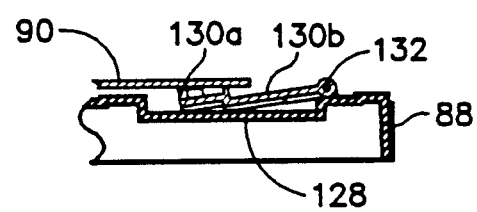
FIG. 16 is a view similar to FIG. 15 illustrating the retracted position of the tray guard.

Referring still to FIG. 11, a tray guard 130 is mounted adjacent a side edge of the tray for engaging the side edge of the tape cartridge as it is inserted onto the tray. The tray guard is mounted for movement to an operative (elevated) position adjacent a side edge of the tray and for subsequent movement away from the operative position to permit the cartridge to engage the read/write head and the capstan drive roller. The tray guard includes a vertical abutment portion 130a which is connected to the remote end of an arm portion 130b of the guard. The rear end of the arm portion 130b is pivotally connected to platform 128 for rotation about a horizontal axis about pin 132. The elevated and retracted portions of the tray guard 130 are illustrated in FIGS. 15 and 16, respectively. A torsion spring (not visible) wrapped about pin 132 biases the tray guard to its elevated position. When the operator pushes the tape cartridge 40 into the transport, the tray guard engages and guides the side edge 52 of the cartridge past the read/write head 112. This prevents damage to the delicate face of the head. When tray 90 retracts, a ramp (not visible) on the underside thereof engages the tray guard to cause it to retract.

Figure 4:
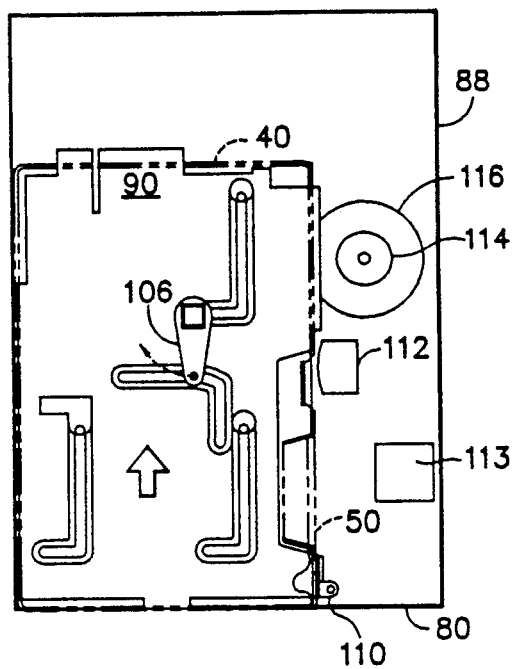
Figure 5:
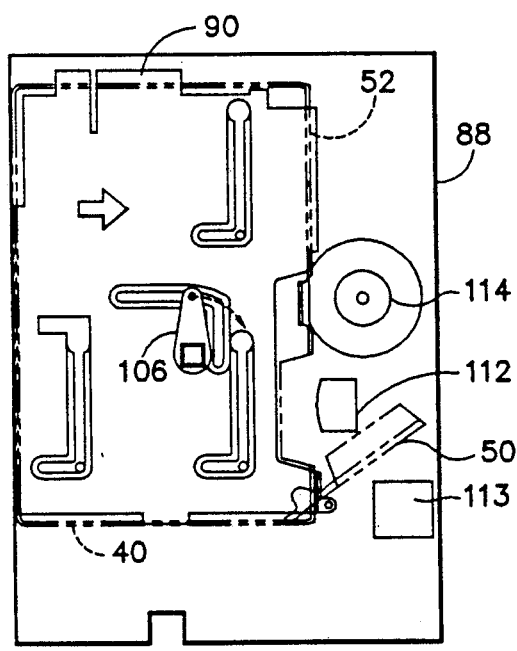
Figure 6:
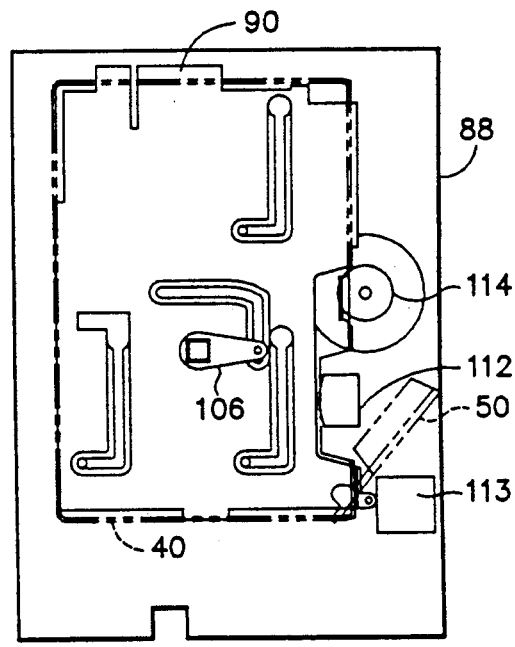
Figure 17:
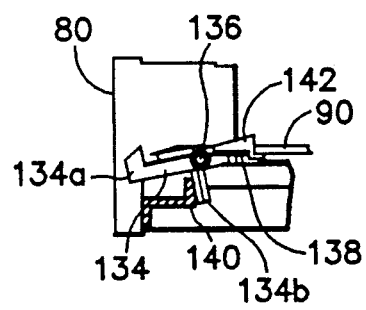
FIG. 17 is a fragmentary vertical sectional view taken along the longitudinal dimension of the preferred embodiment of the tape transport illustrating details of the cartridge latch in its retracted.
Figure 18:
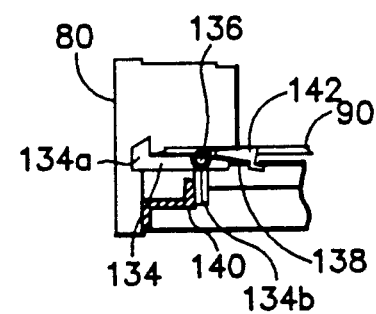
FIG. 18 is a view similar to FIG. 17 illustrating the elevated position of the cartridge latch.

When the tape cartridge 40 is inserted through the front panel 80 onto the tray 90 the front end of the cartridge must be latched so that the cartridge can thereafter be automatically pulled into the transport as illustrated in FIGS. 4 and 5. Similarly the cartridge must be unlatched during the ejection sequence. Referring to FIG. 17, a cartridge latch 134 is pivotally connected to the front edge of the tray 90 by pin 136. The cartridge latch is spring biased for rotation in a clockwise direction by a torsion spring 138 that wraps around the pin 136. A lower leg 134a of the latch extends at a right angle relative to a hook portion 134b thereof. The lower leg 134a abuts a shoulder 140 of the front panel which prevents further clockwise rotation of the latch. Upon rearward movement of the tray 90, the latch 134 rotates to the position illustrated in FIG. 18. The hook portion 134b thereby rises up and engages the front edge of the metal base plate 42 of the cartridge. Upon forward motion of the tray, the hook portion of the latch 134b is retracted to permit ejection and withdrawal of the cartridge. The front latch 134 will clamp onto the cartridge when the same has been fully inserted into the transport. This provides a tactile feel to the operator and a fool proof way to sense when the cartridge is loaded.

There are three discrete positions of the tray 90 and the cartridge 40 carried thereby. These have been previously identified as an initial load position illustrated in FIG. 4, an intermediate load position illustrated in FIG. 5 and a final load position illustrated in FIG. 6. The initial and final load positions are preferably sensed in order ensure that the tray will be stopped in the final correct load position during loading, and in the initial load position during unloading. The final load position can be sensed by the cartridge in place sensors 118 (FIG. 7) which are attached to the frame 88 adjacent the right rear edge of the tray.

Insertion of the tape cartridge onto the tray 90 (the initial load position) must be sensed so that the motor driven gear box 105 can drive the tray and cartridge carried thereby rearwardly and then laterally into engagement with the read/write head and capstan drive roller. Such sensing is accomplished by a upwardly spring biased flag 142 (FIG. 17) which is moved down by the metal base plate 42 of the cartridge. This flag actuates a microswitch (not shown) which in turn sends a signal to the microprocessor 120.

Figure 9:
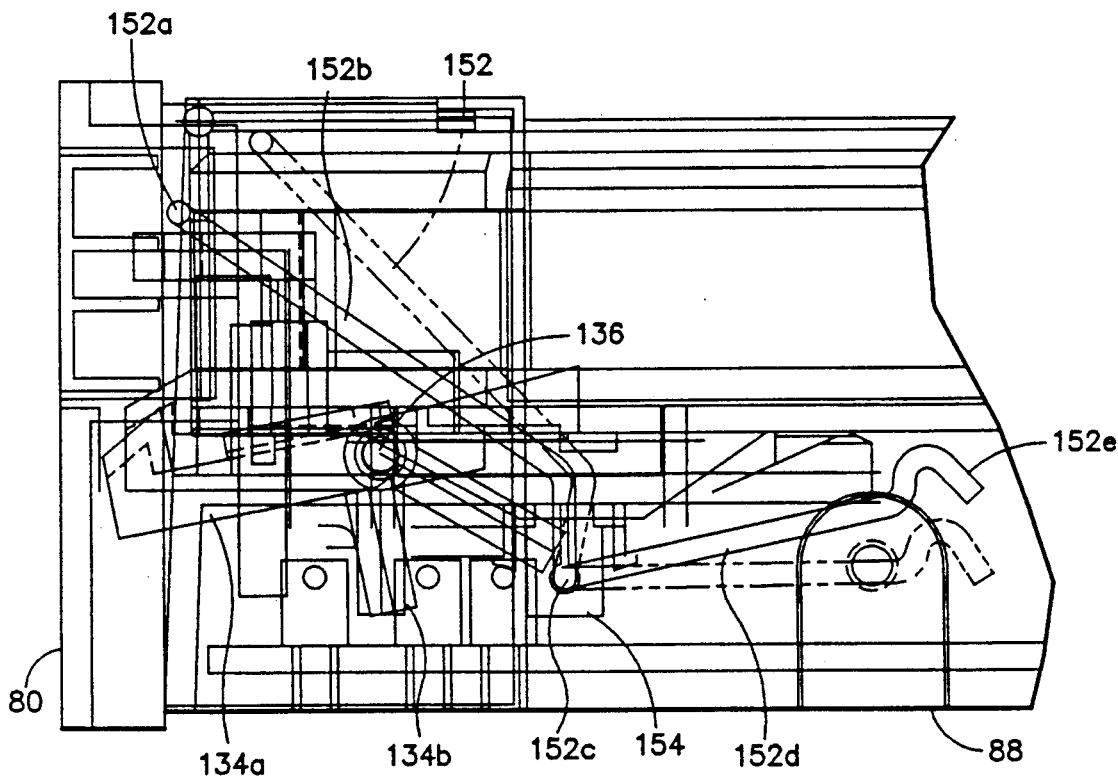
FIG. 9 is an enlarged fragmentary vertical sectional view taken along line 9—9 of FIG. 8 illustrating details of the pivoting cartridge latch adjacent the cartridge insertion slot of the front panel of the preferred embodiment of our transport.

It is desirable that the tape cartridge be discharged of any electrical potential as it is inserted into the transport. This will eliminate static discharge as a source of any read or write errors. In order to accomplish this, the cartridge latch 134 (FIG. 9) is preferably made of a carbon filled plastic. When it engages the metal base plate 42 of the tape cartridge, it discharges any built up electrical charge on the cartridge through the frame 88 of the drive which is grounded. Such discharge minimizes errors during the high density reading and writing of data on the tape 56.

Figure 19:
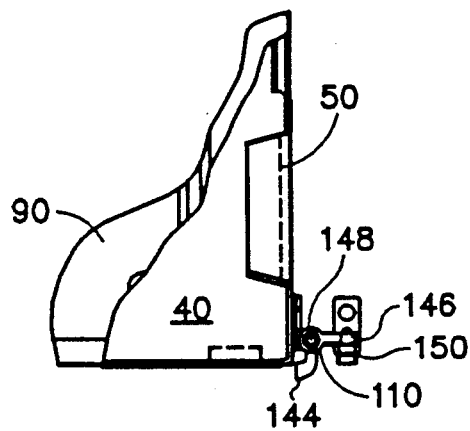
FIGS. 19 and 20 are simplified plan views of the right front corner of the preferred embodiment of the tape transport and loaded tape cartridge with portions broken away illustrating details of the tape access door opener.
Figure 20:
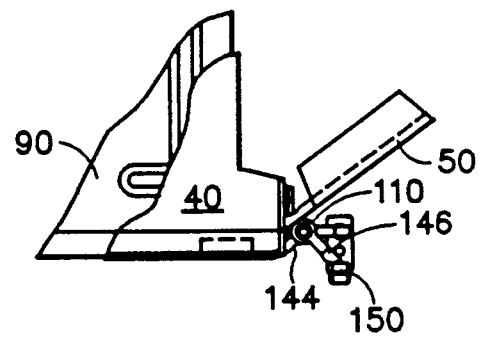
Figure 21:
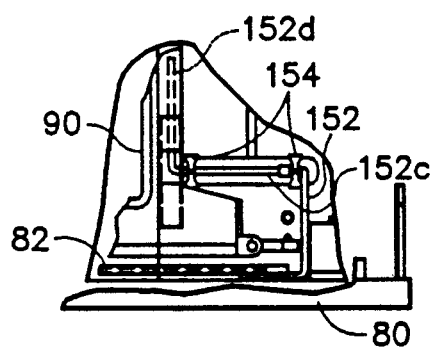
FIG. 21 is a fragmentary plan view of the right front corner of the preferred embodiment of the tape transport illustrating the insertion slot door in its closed position.

Details of the tape access door opener 110 are illustrated in FIGS. 19 and 20. The door opener comprises an L-shaped member with orthogonal arms 144 and 146. The member is pivotally mounted to vertical pin 148 secured to the front right corner of the tray. A torsion spring (not visible) surrounds the pin and biases the member in a clockwise direction so that the arm 146 of the push member pushes against a vertical stop 150. When the cartridge is in its initial load position illustrated in FIGS. 4 and 19, its spring biased tape access door is closed. The spring bias of the push member is stronger than the spring bias of the door. Therefore upon rearward movement of the tray 90 and cartridge 40 carried thereby, the push member rotates clockwise. The curved arm 144 of the push member is configured and dimensioned to push on the rear end of the tape access door 50 as prescribed in the applicable ANSI standard for the DC600-type cartridge. The access door is thus partially opened as illustrated in FIGS. 4-6 and 19-20. During the unloading sequence the stop 150 engages the arm 146 of the push member to rotate the push member and cause the tape access door 50 to close the tape access door before the cartridge is withdrawn from the tape transport. The tape access door 50 is both opened and closed in proper timed sequence during movement of the tray 90 so as to avoid striking the read/write head 112.

Details of the mechanisms which open the cartridge insertion slot door 82 are illustrated in FIGS. 21-24. The door 82 is closed in FIGS. 21 and 22 and is opened in FIGS. 23 and 24. The door 82 is a rectangular planer member dimensioned to seal the cartridge insertion slot in the front panel. A hinge 151 (FIG. 23) connects the upper edge of the door 82 to the portion of the front panel defining the upper edge of the cartridge insertion slot. The hinge 151 permits the door to rotate about a horizontal axis for movement to seal and unseal the cartridge insertion slot. The door 82 seals the slot after the cartridge has been inserted therethrough onto the tray. Prior to ejection of the cartridge from the tape transport, the door 82 is opened to to permit ejection of the cartridge through the slot.

The door 82 is biased to its closed position by a torsion spring (not illustrated) that is wrapped about a pin (not illustrated) through the hinge 151. A rigid wire door opener 152 has a forward segment 152a (FIG. 23) that engages a front side of the door 82, an intermediate rearwardly inclined segment 152b (FIG. 24), an intermediate segment 152c (FIG. 21) that extends through a pair of bushings 154 connected to the platform 128 and a rearward segment 152d (FIG. 24) that extends parallel with the longitudinal dimension of the transport. The wire door opener has a hook-shaped rear end 152e (FIG. 24) which is engaged and moved by ramp 156 extending from the bottom of the tray 90.

Figure 22:
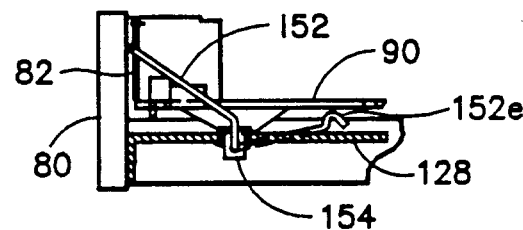
FIG. 22 is a fragmentary vertical sectional view of the right front corner of the preferred embodiment of the tape transport taken along the longitudinal dimension illustrating details of the mechanism for opening the door that seals the cartridge insertion slot.
Figure 23:
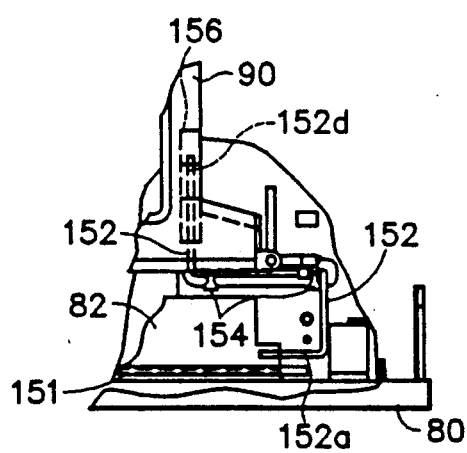
FIG. 23 is a view similar to FIG. 21 except that the cartridge insertion slot door is opened.
Figure 24:
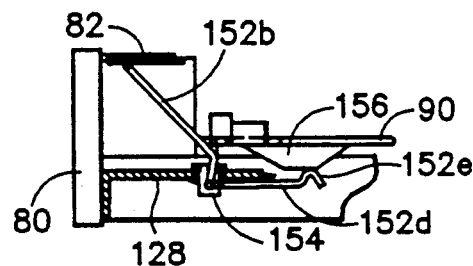
FIG. 24 is a view similar to FIG. 22 except that the cartridge insertion slot door is opened

When the tray 90 moves rearwardly from its initial load position illustrated in FIG. 22 t its position illustrated in FIG. 24, the intermediate raised area of the ramp 156 pushes downwardly on the hook-shaped rear end 152e of the wire. Downward movement of the rearward segment 152d of the wire door opener causes the the forward segment 152a to push the door 82 open against the force of the torsion spring. This permits the cartridge to be loaded through the slot onto the tray. Thereafter, continued rearward movement of the tray causes the hook-shaped end 152e to slide past the ramp, thereby causing the forward wire segment 152a to drop down. This in turn permits the torsion spring to close the door 82 and seal the cartridge insertion slot. The reverse sequence of movements opens the door 82 to permit cartridge ejection.

Figure 25:
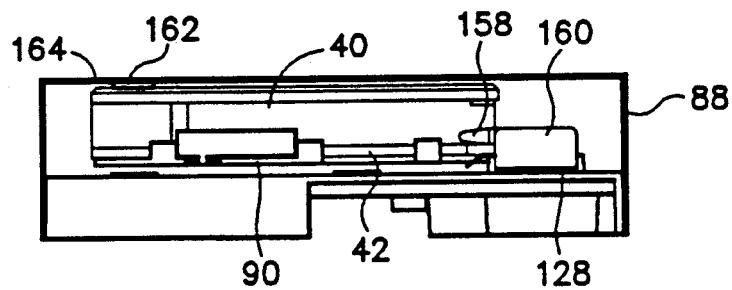
FIG. 25 is simplied elevation view taken from the rear of the preferred embodiment of the tape transport.
Figure 26:
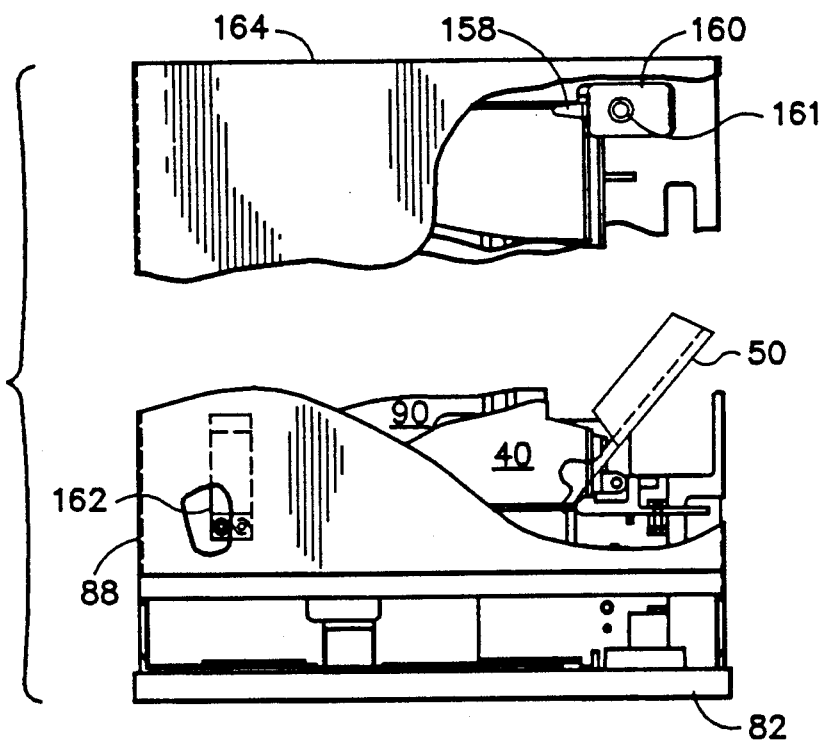
FIG. 26 is an exploded fragmentary plan view of the preferred embodiment tape transport.
Figure 27:
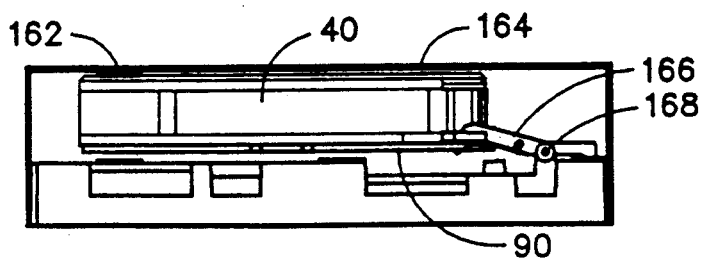
FIG. 27 is a simplified elevation view taken from the front of the preferred embodiment of the tape transport with the front panel removed.

FIGS. 25-27 illustrate details of the registration means connected to the frame for engaging a plurality of predetermined locations on the base plate of the cartridge after the cartridge has been received onto the tray. This establishes a predetermined azimuth angle between the tape in the cartridge and the read/write head. This is a requirement for reliable writing and reading of data at very high densities. It is further a requirement to ensure the interchangeability of cartridges between different tape drives, i.e. so that data written on a tape cartridge in one drive can be reliably read therefrom in another drive. The ANSI standard referred to in the background of the invention states that the base plate of the cartridge shall be referenced at three prescribed locations locations. The tray 90 provides temporary sole support for the cartridge 40 when it is inserted into the transport and during ejection and withdrawal from the transport. When the tray moves rearwardly to its intermediate position, the right rear corner of the metal base plate 42 slides under a reference locator pin 158 (FIG. 25) which extends from a stop 160 connected to the platform 128. The pin is eccentrically located on a cylinder which may be rotated and secured via set screw 161 (FIG. 26) to vary the plane of the cartridge. A top spring 162 (FIGS. 25 and 26) is connected to the underside of the cover 164 that extends across and is connected to the frame 88. The top spring slides over the plastic top cover 44 of the cartridge and biases it downwardly against the tray 90. This pushes the left front corner of the metal base plate 42 of the cartridge firmly against the tray 90.

The pin 158 and top spring 162 thus accomplish two of the three cartridge registration points. The third is provided by the outer end of a registration arm 166 (FIG. 27) which is pivoted about pin 168. The pin in journaled in a bearing 170 that extends upwardly from the platform 128. The outer end is normally biased downwardly by a torsion spring (not visible) wrapped about the pin 168. When the tray 90 moves laterally to engage the cartridge with the head, the tapered outer end of the registration arm 166 is forced up by the front right corner of the metal base plate 42 of the cartridge. The base plate is held downwardly by the arm against the tray 90.

Figure 10:
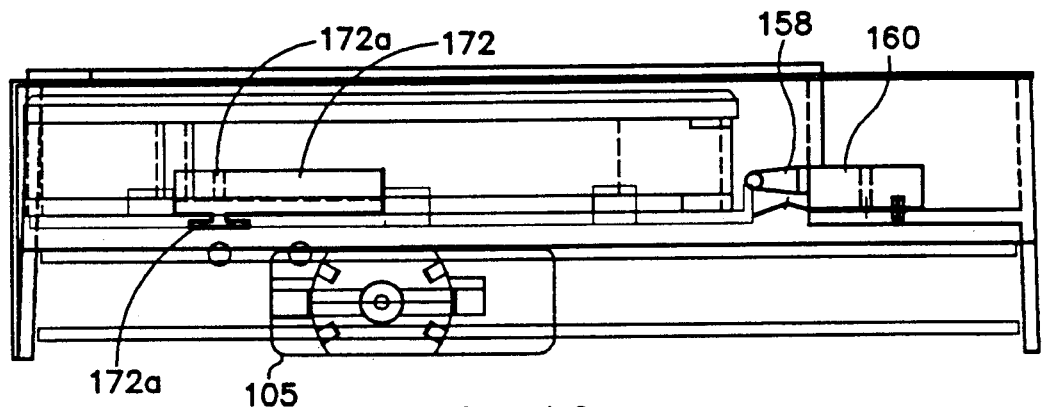
FIGS. 10, 11 and 12 are fragmentary horizontal sectional views taken along lines 10—10, 11—11 and 12—12, respectively, of FIG. 8.

When the cartridge 40 is inserted on the tray 90 the rear end thereof engages a vertical cartridge stop 172 (FIG. 10) which stretches a cartridge ejection spring 174 (FIG. 8) beneath the tray as the same moves rearwardly. The vertical cartridge stop 172 is pushed rearwardly above the tray when the cartridge is inserted thereon to the position illustrated in FIG. 8. It has a lower inverted T-shaped portion 172a (FIG. 10) which is connected to the rearward end of the spring 174. During the unloading sequence, the stored force of this spring ejects the cartridge through the cartridge insertion slot in the front panel once the cartridge latch 134 is released. A leg of the T-shaped portion 172a slides in a recess 175 (FIG. 8) in the tray to guide the movement of the stop. The latch 134 holds the cartridge to keep the ejection spring 174 stretched.

A side barrier 176 (FIG. 8) extends vertically along the left side of the tray 90 and is biased to the right by a pair of coil springs 178. These springs are located beneath the tray and connect to either end of the barrier and to corresponding pins 180 extending from the underside of the tray. The barrier 176 urges the cartridge toward the read/ write head 112 as the tray moves laterally to its final load position.

Figure 8:
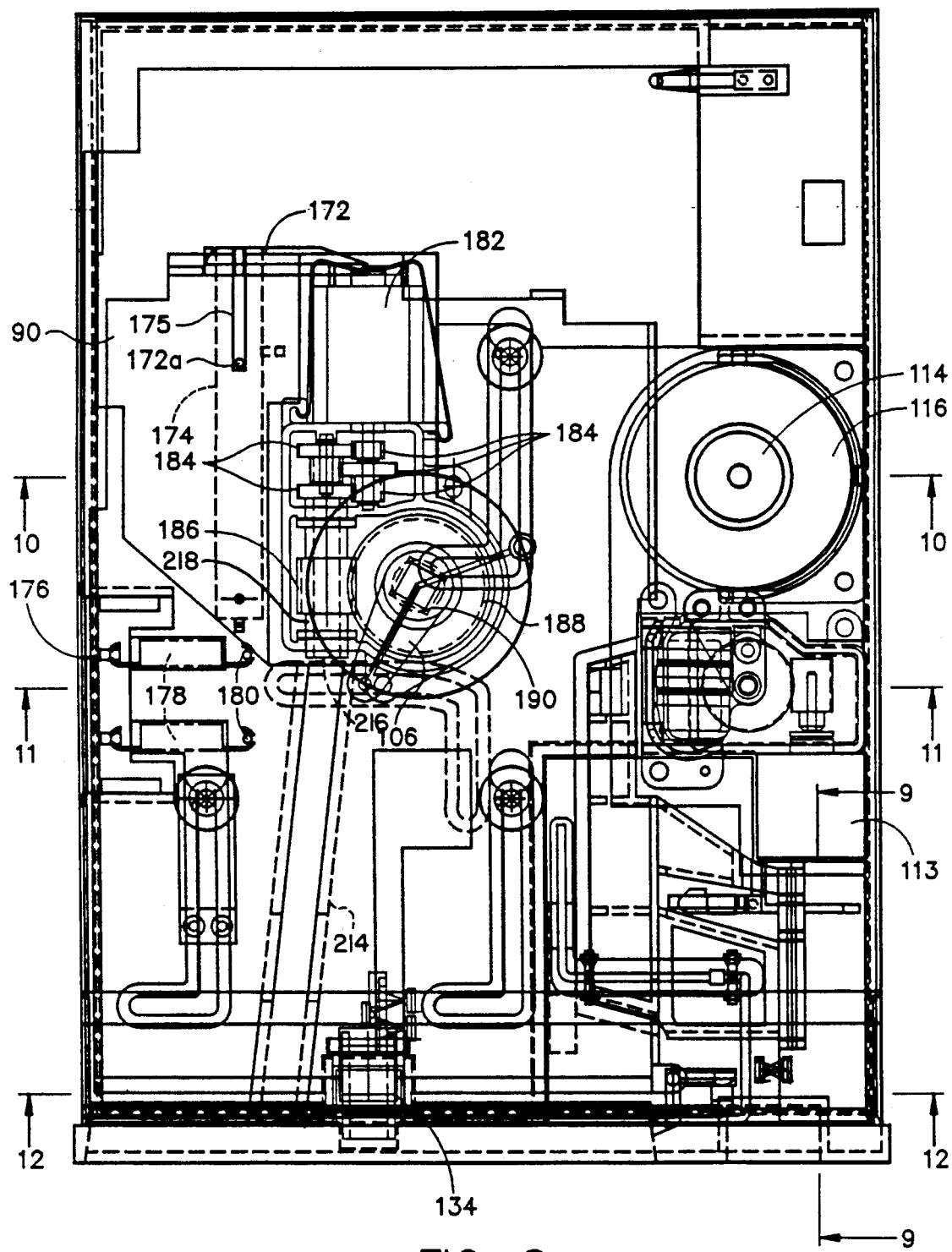
FIG. 8 is an enlarged detailed plan view of the preferred embodiment.

Details of the motor driven gear box 105 that moves the tray 90 are also visible in FIG. 8. A DC motor 182 drives a series of reduction gears 184 that finally drive worm gear 186 at a greatly reduced RPM but with a greatly increased torque. The worm gear meshes with and turns a spur gear 188 connected to the lower end of a shaft 190. The output arm 106 is connected to the upper end of the shaft 190.

Details of the read/write head mounting assembly are visible in FIGS. 13 and 14. The head 112 is supported on a carrier block 192 having an integrally formed vertical bearing 194. A bearing shaft 196 and a drive shaft 198 have their lower ends mounted in a head carrier 200. The bearing shaft 196 extends vertically through the bearing 194 while the drive shaft 198 extends through a track nut housing 202 also formed on the rear of the carrier block 192. A track nut 204 having an internally threaded bore is seated in the track nut housing 202. An externally threaded sleeve 206 is threaded through the bore of the track nut 204 and has a spur gear 208 connected to the lower end thereof. The drive shaft 198 spins within the bore of the sleeve 206 and its upper end is rigidly secured to the track nut 204 for rotating the same. A worm gear 210 is connected to the shaft of the stepper motor 113 and meshes with the spur gear 208 to turn the same, thereby vertically reciprocating the read/write head 112. A curved head guard 212 is secured to the forward part of the carrier 200 to shield the delicate face of the read/write head 112 from the pivoting tape access door of the cartridge.

The transport is provided with means for facilitating manual ejection of the cartridge should the auto-load mechanisms fail electrically and/or mechanically. A guide tube 214 (FIG. 8) extends rearwardly from the front panel 80 to the motor driven gear box 105. A screw driver may be inserted through the guide tube 214 so that its tip engages a screw head 216 on the end of shaft 218 that supports part of the reduction gears. Rotation of the screw driver can thus rotate the output arm 106 and move the tray to the left and then forwardly.

While we have described a preferred embodiment of our mechanical tape transport, it should be understood that modifications and adaptations thereof will occur to persons skilled in the art. Therefore, the protection afforded our invention should only be limited in accordance with the scope of the following claims.

We claim:

1. A transport for a rectangular tape cartridge having a length of six inches and a width of four inches, the cartridge further having a metal base plate, a plastic cover attached to the base plate and enclosing a pair of reels, a tape access door hingedly mounted between the base plate and the cover along a side edge of the cartridge, the access door being pivotable about and axis perpendicular to the base plate to open a cut-out region in the cover and thereby permit access to a length of tape which is windable between the reels by driving a belt capstan roller rotatably mounted along the side edge of the cartridge between the base plate and the cover, the transport comprising:

a frame dimensioned to fit within a rectangular enclosure measuring five and three-quarter inches in width and eight inches in length and to receive the cartridge therein;

a tray located inside the frame for receiving the cartridge endwise thereon so that the base plate of the cartridge is substantially parallel with a plane of the tray and the side edge of the cartridge is generally parallel to a longitudinal axis of the frame which coincides with the eight inch length dimension of the rectangular enclosure;

means connected to the frame adjacent the tray for opening the access door of the cartridge;

a read/write head;

means mounted to the frame adjacent the tray for supporting the read/write head for movement along a head reciprocation axis generally perpendicular to the base plate of the cartridge;

first electric motor means for selectively moving the read/write head along the head reciprocation axis;

a capstan drive roller;

means for rotatably mounting the capstan drive roller adjacent the tray;

second electric motor means for driving the capstan drive roller;

means for mounting the tray to the frame for movement in a direction generally transverse to the longitudinal axis of the frame to thereby transversely move the cartridge to engage the tape exposed by opening the access door with the read/write head and to engage the capstan drive roller with the belt capstan roller; and third electric motor means for transversely moving the tray.

2. A transport according to claim 1 wherein the tray mounting means also permits movement of the tray in a longitudinal direction to thereby move the cartridge rearwardly.

3. A transport according to claim 2 wherein the access door opening means opens the access door during rearward movement of the tray in the longitudinal direction.

4. A transport according to claim 2 and further comprising latch means for holding down the base plate of the cartridge after the cartridge has been inserted through the slot onto the tray and moved rearwardly on the tray.

5. A transport according to claim 1 and further comprising registration means connected to the frame for engaging a plurality of predetermined locations on the base plate of the cartridge after the cartridge has been received onto the tray to thereby establish a predetermined azimuth angle between the tape in the cartridge and the read/write head.

6. A transport according to claim 1 and further comprising a front panel connected to the frame and extending across a forward transverse end of the frame, the front panel having a slot dimensioned so that the cartridge can be endwise inserted therethrough onto the tray.

7. A transport according to claim 6 and further comprising a front panel door dimensioned to seal the cartridge insertion slot, hinge means connecting the front panel door to the front panel for movement to seal and unseal the slot, and means for moving the front panel door to seal the slot after the cartridge has been inserted therethrough onto the tray and for thereafter moving the front panel door to unseal the slot to permit ejection of the cartridge through the slot.

8. A transport according to claim 1 and further comprising a tray guard, means for mounting the tray guard for movement to an operative position adjacent a side edge of the tray for engaging the side edge of the cartridge as it is inserted onto the tray, and for subsequent movement away from the operative position to permit the cartridge to engage the read/write head and the capstan drive roller.

9. A transport according to claim 1 wherein the tray mounting means includes a plurality of guide slots formed in the tray and a plurality of guide pins extending from the frame through corresponding ones of the guide slots.

10. A transport according to claim 1 wherein the third motor means includes an output arm coupled to the tray and rotatable to transversely move the tray.

11. A transport according to claim 1 wherein the fist, second and third electric motor means comprise first, second and third separate electric motors, respectively.

12. A transport for a rectangular tape cartridge having a length of six inches and a width of four inches, the cartridge further having a metal base plate, a plastic cover attached to the base plate and enclosing a pair of reels, a tape access door hingedly mounted between the base plate and the cover along a side edge of the cartridge, the access door being pivotable about an axis perpendicular to the base plate to open a cut-out region in the cover and thereby permit access to a length of tape which is windable between the reels by driving a belt capstan roller rotatably mounted along the side edge of the cartridge between the base plate and the cover, the transport comprising:

a frame dimensioned to fit within a rectangular enclosure measuring five and three-quarter inches in width and eight inches in length and to receive the cartridge therein;

a tray located inside the frame for receiving the cartridge endwise thereon so that the base plate of the cartridge is substantially parallel with a plane of the tray and the side edge of the cartridge is generally parallel to a longitudinal axis of the frame which coincides with the eight inch length dimension of the rectangular enclosure;

a front panel connected to the frame and extending across a forward transverse end of the frame, the front panel having a slot dimensioned so that the cartridge can be endwise inserted therethrough onto the tray;

means connected to the frame adjacent the tray for opening the access door of the cartridge;

a read/write head;

means mounted to the frame adjacent the tray for supporting the read/write head for movement along a head reciprocation axis generally perpendicular to the base plate of the cartridge;

first electric motor means for selectively moving the read/write head along the head reciprocation axis;

a capstan drive roller;

means for rotatably mounting the capstan drive roller adjacent the tray;

second electric motor means for driving the capstan drive roller;

means for mounting the tray to the frame for sequential movement in a direction generally parallel to the longitudinal axis of the frame and thereafter in a direction generally transverse to the longitudinal axis of the frame to thereby move the cartridge rearwardly and then laterally to engage the tape exposed by opening the access door with the read/write head and to engage the capstan drive roller with the belt capstan roller; and third electric motor means for moving the tray longitudinally and transversely.

13. A transport according to claim 12 and further comprising registration means connected to the frame for engaging a plurality of predetermined locations on the base plate of the cartridge after the cartridge has been received onto the tray to thereby establish a predetermined azimuth angle between the tape in the cartridge and the read/write head.

14. A transport according to claim 12 wherein the access door opening means opens the access door during rearward movement of the tray in the longitudinal direction.

15. A transport according to claim 12 and further comprising a front panel door dimensioned to seal the cartridge insertion slot, hinge means connecting the front panel door to the front panel for movement to seal and unseal the slot, and means for moving the front panel door to seal the slot after the cartridge has been inserted therethrough onto the tray and for thereafter moving the front panel door to unseal the slot to permit ejection of the cartridge through the slot.

16. A transport according to claim 12 and further comprising latch means adjacent the front panel for holding down the base plate of the cartridge after the cartridge has been inserted through the slot onto the tray and moved rearwardly on the tray.

17. A transport according to claim 12 and further comprising a tray guard, means for mounting the tray guard for movement to an operative position adjacent a side edge of the tray for engaging the side edge of the cartridge as it is inserted onto the tray, and for subsequent movement away from the operative position to permit the cartridge to engage the read/write head and the capstan drive roller.

18. A transport according to claim 12 wherein the tray mounting means includes a plurality of L-shaped guide slots formed in the tray and a plurality of guide pins extending from the frame through corresponding ones of the guide slots.

19. A transport according to claim 18 wherein the third motor means includes an output arm coupled to the tray and rotatable to move the tray longitudinally and transversely.

20. A transport according to claim 12 wherein the first, second and third electric motor means comprise first, second and third separate electric motors, respectively.

21. A transport for a rectangular tape cartridge having a length of six inches and a width of four inches, the cartridge further having a metal base plate, a plastic cover attached to the base plate and enclosing a pair of reels, a tape access door hingedly mounted between the base plate and the cover along a side edge of the cartridge, the access door being pivotable about an axis perpendicular to the base plate to open a cut-out region in the cover and thereby permit access to a length of tape which is windable between the reels by driving a belt capstan roller rotatably mounted along the side edge of the cartridge between the base plate and the cover, the transport comprising:

a frame dimensioned to fit within a rectangular enclosure measuring five and three-quarter inches in width and eight inches in length and to receive the cartridge therein;

a tray located inside the frame for receiving the cartridge endwise thereon so that the base plate of the cartridge is substantially parallel with a plane of the tray and the side edge of the cartridge is generally parallel to a longitudinal axis of the frame which coincides with the eight inch length dimension of the rectangular enclosure;

a front panel connected to the frame and extending across a forward transverse end of the frame, the front panel having a slot dimensioned so that the cartridge can be endwise inserted therethrough onto the tray;

a push member connected to the frame adjacent the tray for opening the access door of the cartridge;

a read/write head;

a head mounting assembly connected to the frame adjacent the tray for supporting the read/write head for movement along a head reciprocation axis generally perpendicular to the base plate of the cartridge;

a stepper motor drivingly connected to the head mounting assembly for selectively moving the read/write head along the head reciprocation axis;

a capstan drive motor having an output shaft;

a capstan drive roller mounted on an end of the output shaft of the capstan drive motor;

a capstan drive mounting assembly for supporting the capstan drive motor so that the capstan drive roller is positioned adjacent the tray;

a plurality for guides connected to the frame for directing sequential movement of the tray in a direction generally parallel to the longitudinal axis of the frame and thereafter in a direction generally transverse to the longitudinal axis of the frame to thereby move the cartridge rearwardly and then laterally to engage the tape exposed by opening the access door with the read/write head and to engage the capstan drive roller with the belt capstan roller;

a tray drive mechanism mounted to the frame for moving the tray longitudinally and transversely; and a tray motor drivingly connected to the tray drive mechanism.

22. A transport according to claim 21 and further comprising a plurality of registration locators connected to the frame for engaging a plurality of predetermined locations on the base plate of the cartridge after the cartridge has been received onto the tray to thereby establish a predetermined azimuth angle between the tape in the cartridge and the read/write head.

23. A transport according to claim 21 wherein the access door opening member opens the access door during rearward movement of the tray in the longitudinal direction.

24. A transport according to claim 21 and further comprising a front panel door dimensioned to seal the cartridge insertion slot, a hinge assembly connecting the front panel door to the front panel for movement to seal and unseal the slot, and an actuator for moving the front panel door to seal the slot after the cartridge has been inserted therethrough onto the tray and for thereafter moving the front panel door to unseal the slot to permit ejection of the cartridge through the slot.

25. A transport according to claim 21 and further comprising a latch mechanism adjacent the front panel for holding down the base plate of the cartridge after the cartridge has been inserted through the slot onto the tray and move rearwardly on the tray.

26. A transport according to claim 21 and further comprising a tray guard connected to the frame and movable to an operative position adjacent a side edge of the tray for engaging the side edge of the cartridge as it is inserted onto the tray, and for subsequent movement away from the operative position to permit the cartridge to engage the read/write head and the capstan drive roller.

27. A transport according to claim 21 wherein the tray a plurality of L-shaped guide slots are formed in the tray and receive therethrough corresponding ones of the guides.

28. A transport accoring to claim 21 wherein the tray drive mechanism includes an output arm having an outer end which engages the tray, the output arm being rotatable to move the tray longitudinally and transversely.

29. A tape transport configured to have a DC600-type cartridge endwise loaded therein, comprising:
a frame dimensioned to fit within a five and one-quarter inch form factor;
means for slidably receiving and supporting the cartridge as it is manually inserted endwise within frame to an initial loading position;
a transducer for writing data on a length of tape inside the cartridge and for reading data written thereon;
means for mounting the transducer to the frame adjacent the cartridge supporting means for reciprocating the transducer along an axis perpendicular to a base plate of the cartridge;
capstan drive means mounted to the frame adjacent the cartridge supporting means for driving a belt capstan roller of the cartridge;
means for guiding the cartridge supporting means to move the cartridge in a rearward direction from the initial loading position to an intermediate loading position;
means for opening a tape access door of the cartridge as the cartridge is moved in the rearward direction;
means for guiding the cartridge supporting means to move the cartridge in a lateral direction from the intermediate loading position to a final loading position in which the transducer engages the length of tape exposed by opening the tape access door and the capstan drive means engages the belt capstan roller of the cartridge; and
electric load motor means for driving the cartridge supporting means to move the cartridge from the initial loading position through the intermediate loading position to the final loading position.

30. A transport according to claim 29 wherein the cartridge supporting means includes a tray.

31. A transport according to claim 30 and further comprising a tray guard, means for mounting the tray guard for movement to an operative position adjacent a side edge of the tray for engaging the side edge of the cartridge as it is inserted onto the tray, and for subsequent movement away from the operative position to permit the cartridge to engage the read/write head and the capstan drive roller.

32. A transport according to claim 30 wherein the guide means includes a plurality of guide slots formed in the tray and a plurality of guide pins extending from the frame through corresponding ones of the guide slots.

33. A transport according to claim 30 wherein the load motor means includes an output arm coupled to the tray and rotatable to move the tray and the cartridge supported thereby from the initial loading position through the intermediate loading position to the final loading position.

34. A transport according to claim 29 wherein the cartridge supporting means includes registration means connected to the frame for engaging a plurality of predetermined locations on the base plate of the cartridge to thereby establish a predetermined azimuth angle between the tape in the cartridge and the transducer.

35. A transport according to claim 29 and further comprising a front panel connected to the frame and extending across a forward transverse end of the frame, the front panel having a slot dimensioned so that the cartridge can be endwise inserted therethrough onto the cartridge supporting means.

36. A transport according to claim 35 and further comprising a front panel door dimensioned to seal the cartridge insertion slot, hinge means connecting the front panel door to the front panel for movement to seal and unseal the slot, and means for moving the front panel door to seal the slot after the cartridge has been inserted therethrough onto the cartridge supporting means and for thereafter moving the front panel door to unseal the slot to permit ejection of the cartridge through the slot.

37. A transport according to claim 35 and further comprising latch means adjacent the front panel for engaging the base plate of the cartridge after the cartridge has been inserted through the slot onto the cartridge supporting means.

* * * * *